United States Patent [19]
Suzuki et al.

[11] Patent Number: 5,739,611
[45] Date of Patent: Apr. 14, 1998

[54] ELECTRO-MAGNETIC CLUTCH WITH MECHANISM

[75] Inventors: Katsumi Suzuki, Takahama; Mamoru Nakamura, Kariya; Hideya Hori, Okazaki, all of Japan

[73] Assignee: Aisin Seiki Kabushiki Kaisha, Kariya, Japan

[21] Appl. No.: 549,177

[22] Filed: Oct. 27, 1995

[30] Foreign Application Priority Data

Oct. 28, 1994 [JP] Japan ................................. 6-265796

[51] Int. Cl.$^6$ ..................................................... F16D 27/10
[52] U.S. Cl. ............................. 310/103; 310/78; 310/98; 192/84 A; 192/84 B
[58] Field of Search ........................... 310/103, 95, 98, 310/78, 106, 105, 96; 192/84 A, 84 B

[56] References Cited

U.S. PATENT DOCUMENTS

| | | | |
|---|---|---|---|
| 4,033,438 | 7/1977 | Wiltsey | 192/84 A |
| 4,972,932 | 11/1990 | Nakamura et al. | 192/84 B |
| 4,993,532 | 2/1991 | Weiss et al. | 192/111 A |
| 5,080,214 | 1/1992 | Fossum | 192/84 R |

FOREIGN PATENT DOCUMENTS 2-48625  4/1990  Japan .

*Primary Examiner*—Steven L. Stephan
*Assistant Examiner*—Tran N. Nguyen
*Attorney, Agent, or Firm*—Burns, Doane, Swecker & Mathis, LLP

[57] ABSTRACT

To make the turning "on" and "off" of a clutch in an electro-magnetic clutch smoother, the electro-magnetic clutch has a first rotating member rotatable in response to the driving force applied to the input axis, and a second rotating member arranged opposite to the first rotating member and freely rotatable about the rotation axis of the first rotating member and coupled to the output axis. A movable member is coupled to one end of a return spring and is disposed between the first rotating member and the second rotating member for movement along the rotation axis of the first rotating member. An electric coil generates a force to drive the movable member along the rotation axis of the first rotating member. Cylindrical auxiliary slide members are arranged approximately at equal intervals on the movable member and are disposed between the movable member and the second rotating member. The axes of the auxiliary slide members pass through the center of the rotation axis of the first rotating member and extend perpendicular to the rotation axis.

12 Claims, 4 Drawing Sheets

ELECTRO-MAGNETIC CLUTCH WITH MECHANISM

BACKGROUND OF THE INVENTION

1. Field of the Invention

The present invention relates to an electro-magnetic clutch in which the clutch is coupled and released by applying the force of a spring and a driving force acting between an electromagnet and a magnetic material to move a movable member.

2. Related Art

Among conventional examples of these kinds of electro-magnetic clutches one presented in the JP Utility Model Kokai Publication H2-48625, for example, is known.

In this kind of electro-magnetic clutch, a rotating member coupled to an input axis and a rotating member coupled to an output axis are disposed opposing each other and a clutch plate is disposed between them. The clutch plate is coupled to a rotating member on one of the input and output sides through a return spring so that the clutch plate can move along its axis; is attracted by an electromagnet arranged at a position opposing the clutch plate to abut to the rotating member of the other side; as a result both rotating members are coupled to each other. When the electromagnet loses its attraction force, the clutch plate separates from the rotating member by the force of the return spring to cause a clutch to turn "off."

SUMMARY OF THE DISCLOSURE

However, the following problem has been encountered according to the investigation by the applicants. In the technology presented in the above Publication the clutch plate and the rotating member are coupled by a leaf spring which is formed integrally with the return spring.

In this spring, one leaf spring has a plurality of supporting points. However, in this structure the spring reaction force at individual supporting points is apt to fluctuate and it may be difficult to turn the clutch "off" while the rotating member is rotating.

Accordingly, an object of the present invention is to provide an electro-magnetic clutch capable of turning the clutch "on" or "off" more smoothly.

It is another object of the invention to develop a spring and torque transmission mechanism which can turn an electro-magnetic clutch on or off more smoothly.

Other objects of the invention will become apparent in the entire disclosure.

To solve the above object, according to one aspect of the present invention there is provided an electro-magnetic clutch which comprises hole portions formed on one of the first and second rotating members, protrusions formed on a movable member and slidably fitting into the hole portions, and auxiliary slide members disposed in spaces formed between the protrusions and hole portions.

PREFERRED EMBODIMENTS

According to a first aspect of the present invention, there is provided an electro-magnetic clutch comprising:

a first rotating member rotatable in response to driving force applied to an input axis;

a second rotating member disposed opposing said first rotating member, freely rotatable about the rotation axis of said first rotating member, and coupled to an output axis;

a movable member formed to be rotatable in unison with one of said first and second rotating member and disposed opposing the other of said first and second rotating members;

a spring urging said movable member toward one of said first and second rotating member;

an electric coil generating force to drive said movable member toward the other of said first and second rotating member;

hole portions formed on one of said first and second rotating member;

protrusions formed on said movable member and slidably fitting into said hole portions; and auxiliary slide members disposed in spaces formed between said protrusions and hole portions.

According to a second aspect of the present invention, the auxiliary slide members in the electro-magnetic clutch according to the primary aspect are formed in the shape of a ball or cylindrical rod an axis of which passes through the vicinity of a center of the rotation axis and is perpendicular to the rotation axis. In case where these auxiliary slide members are in the cylindrical rod shade and the axis of which does not pass through the very center of the rotation axis with a slight deflection, there is no special problem unless it affects the movement of the movable member.

According to a third aspect of the present invention, the arrangement of the auxiliary slide members on the movable member in the electro-magnetic clutch according to any one of the primary, first and second aspects is developed to be approximately at equal intervals around the rotation axis.

According to a fourth aspect of the present invention, retaining parts of the auxiliary slide members are formed beneath the spaces containing the auxiliary slide members on either one of the first and second rotating members in the electro-magnetic clutch according to any one of the primary to third aspects.

Modes of Operations

According to the feature of the primary or first aspect, explanation on the operation will be given first, in case where unison rotation of the movable member and the second rotating member occurs. An excited electric coil generates magnetic attraction force between the movable member and the first rotating member. As a result the first rotating member attracts the movable member against the spring force and the movable member and the first rotating member abut each other. An engaging configuration mechanism (e.g., protrusion and recess) is formed on the abutting surfaces of the movable member and the first rotating member so that they can engage with each other. This enables an input from the input axis to be transmitted to the output axis. Disenergization of the electric coil results in loss of the attracting force between the first rotating member and the movable member, and the movable member separates from the first rotating member by the urging force of the spring; with the engagement turning off. The arrangement of the auxiliary slide members between hole portions formed on the first rotating member and the protrusions formed on the movable member serves to reduce the sliding friction at the sliding contact part caused by strokes of the movable member. The same also applies to the case where the movable member and the first rotating member rotate in unison.

According to the feature of the second aspect, the auxiliary slide members in the shape of a cylindrical rod or ball can roll whenever the movable member slides; and thus the movable member can slide smoothly under any conditions. Furthermore, even when the movable means is rotating, such arrangement of the auxiliary slide members makes it easy for the auxiliary slide members to roll in the directions of the sliding and rotation of the movable member. As a result the movable member can be smoothly moved alone the rotation axis.

According to the feature of the third aspect, the arrangement of the auxiliary slide members is approximately at equal intervals around the rotation axis, so that the sliding friction caused by strokes of the movable member is equally dispersed over the movable member.

According to the feature of the fourth aspect, the retaining parts of the auxiliary slide members beneath the spaces containing the auxiliary slide members always make it possible for the auxiliary slide member to roll when the movable member slides.

In sum, the following meritorious effects are achieved according to the various aspects of the present invention.

According to the feature of the primary aspect, the arrangement of the auxiliary slide means makes changing-over of the electro-magnetic clutch to "on" and "off" very smooth.

According to the feature of the second aspect, rolling of the auxiliary slide means in the shape of a cylindrical rod or ball during strokes of the movable member serves to reduce the sliding friction between the movable member and the rotating means. Furthermore, strokes of the movable member does not become difficult even under an existing torque applied to the electro-magnetic clutch.

According to the feature of the third aspect, the arrangement of the auxiliary slide means on the movable member is approximately at equal intervals about the rotation axis; and thus the sliding friction caused by strokes of the movable member equally disperses over the movable member and strokes of the movable member become smooth.

According to the feature of the fourth aspect, the retaining parts of the auxiliary slide means formed beneath the spaces containing the auxiliary slide means always make it possible for the cylindrical auxiliary slide means to roll when the movable member slides; and thus the movable member can move smoothly under any conditions and the auxiliary slide means do not fall out of the spaces between the protrusions and the hole portions during strokes of the movable member.

DETAILED DESCRIPTION OF THE PREFERRED EMBODIMENT

Figure 1:
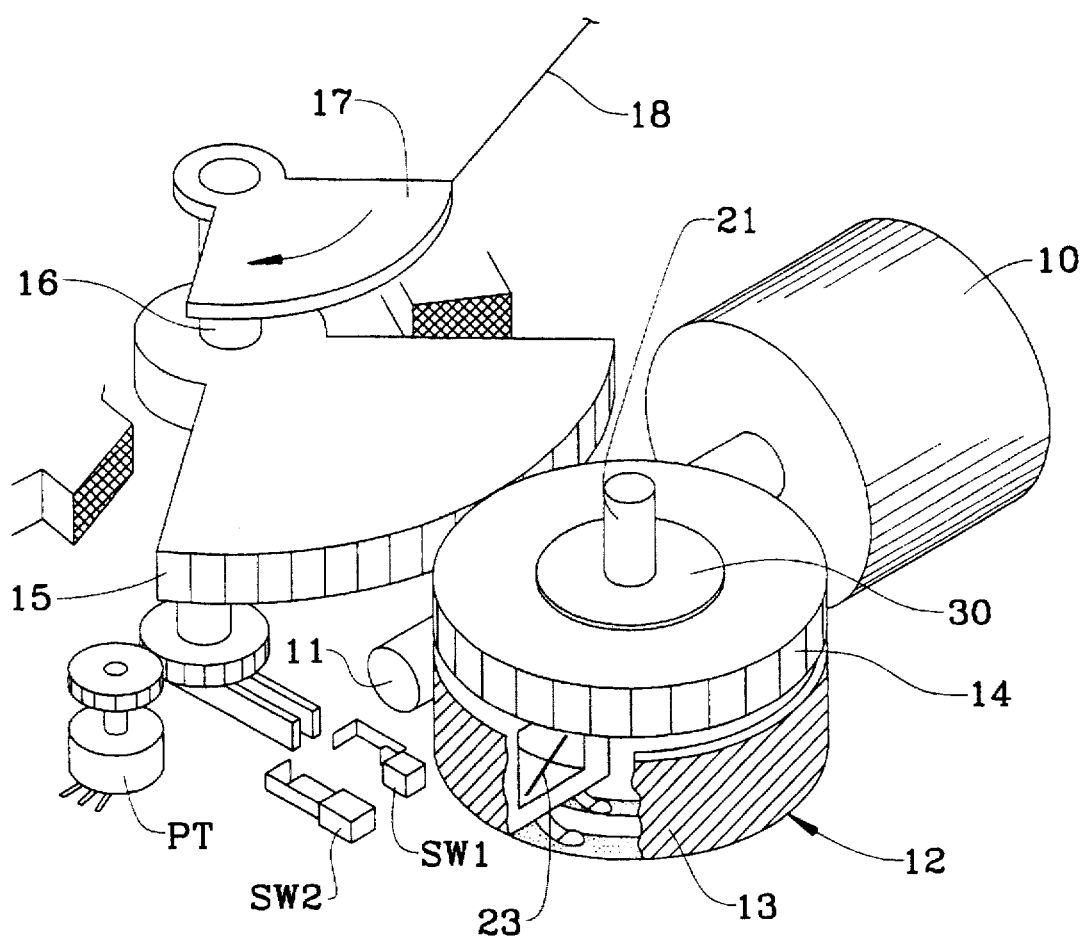
FIG. 1 is a perspective view showing major components in an actuator of an embodiment according to the invention.

An embodiment of the invention will be described below. In this embodiment an actuator to adjust the opening degree of a throttle valve in a speed control of a car is shown as an example. FIG. 1 shows an outline of the primary components in this actuator.

An electro-magnetic clutch in the embodiment is an electro-magnetic clutch 12 having a first rotating member, i.e., worm wheel 13, rotatable in response to the driving force applied to an input axis 11, a driving shaft of an electric motor 10; a second rotating member, i.e., pinion gear 14, disposed opposing the worm wheel 13, freely rotatable around a rotation axis 21 of the worm wheel 13, and coupled to an output axis 16 on the circumference thereof; a movable member, i.e., clutch plate 24, coupling one end of a coil spring 25 (return spring) to the pinion gear 14, arranged between the worm wheel 13 and the pinion gear 14, and movable (slidable) along the rotation axis 21; and an electric coil 23 generating a force to drive the clutch plate 24 along the rotation axis 21. The clutch plate 24 is movable along the rotation axis 21 relative to the pinion gear 14 but unrotatable in the direction of rotation of the rotation axis 21. That is, the rotation of the clutch plate 24 accompanies that of the pinion gear 14. Retaining means (cover plate) 30 is formed on a side of the pinion gear 14 opposite to the clutch plate 24, to prevent the auxiliary slide members 26 from springing outward.

Referring to FIG. 1, the input axis 11 of the electric motor 10 engages with the worm wheel 13 of the electro-magnetic clutch 12; the pinion gear 14 arranged on the output side of the electro-magnetic clutch 12 engages with a final gear 15; and a driving wire 18 coupled to a throttle valve (not shown) engages with an arm 17 fixed to an output axis 16 supporting the final gear 15. In this figure, PT is a potentiometer for detecting the opening degree of an actuator; SW1 and SW2 are limit switches.

Figure 2:
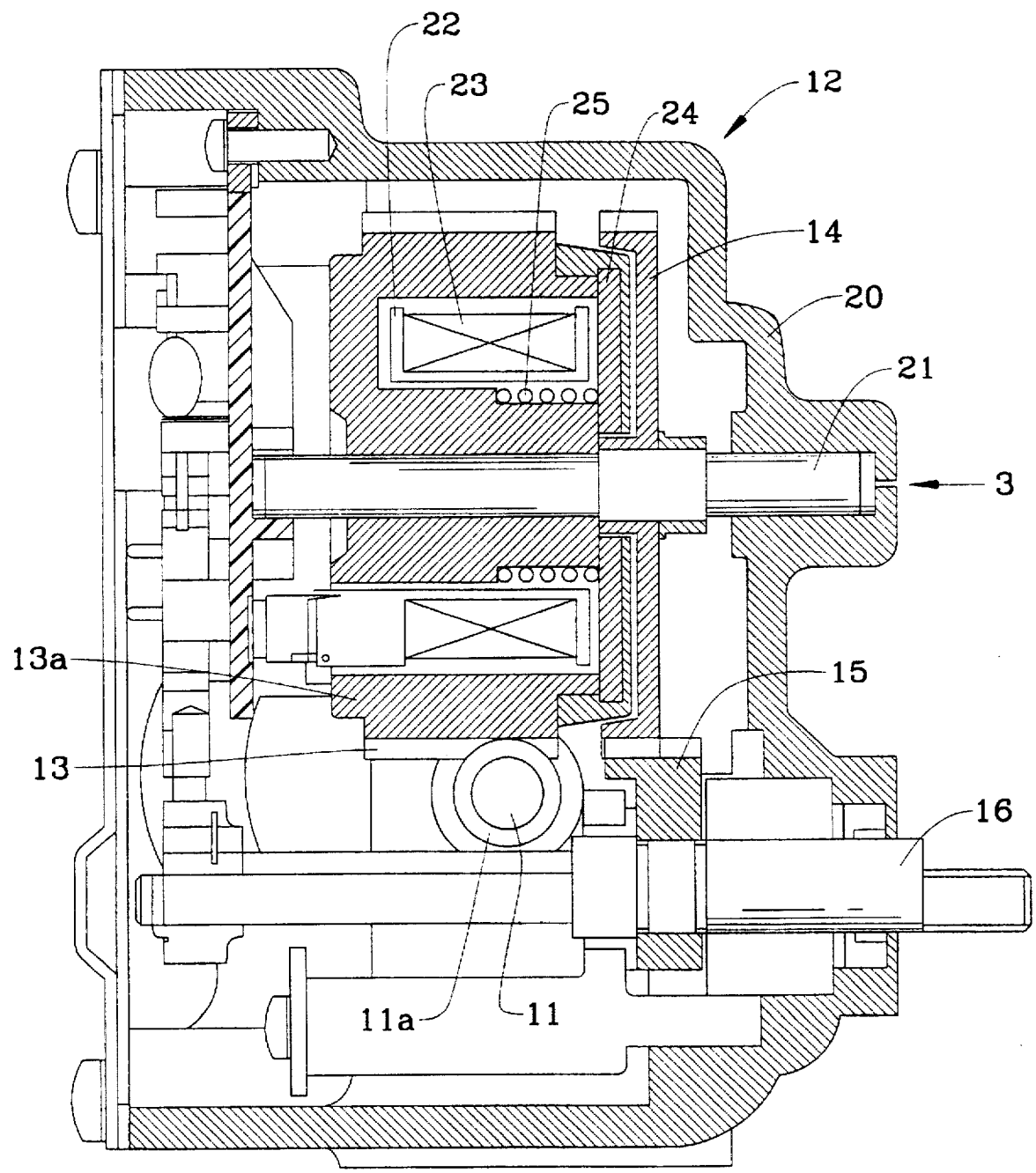
FIG. 2 is a front cross sectional view of the actuator of FIG. 1.

Now referring to FIG. 2, the internal structure of the electro-magnetic clutch 12 will be described below. FIG. 2 is a cross section of the actuator of FIG. 1. FIG. 2 shows a state that the clutch plate 24 is urged (pulled) to the worm wheel 13 side. Gears 11a formed on the input axis 11, i.e., the driving axis of the electric motor 10, are engaging with gears 13a formed on the circumference of the worm wheel 13. The worm wheel 13 fits onto the circumference of the rotation axis 21 fixedly supported in a housing 20 so that the worm wheel 13 can freely rotate about the rotation axis 21. The worm wheel 13 is made of a magnetic material and has a cylindrical bobbin 22 and an electric coil 23 wound around the bobbin 22 therein.

Next, operation of the electro-magnetic clutch 12 in this embodiment will be briefly explained below. The clutch plate 24 is made of a magnetic material; and thus by the magnetic attraction between the clutch plate 24 and the worm wheel 13 caused by excitation of the electric coil 23 in the worm wheel 13, the clutch plate 24 is attracted to the worm wheel 13 and they abut to each other. An engaging configuration mechanism (e.g., protrusion and recess or shoulder), not shown in the Figure, is formed on abutting surfaces of the clutch plate 24 and the worm wheel 13 so that they can engage with each other. When the clutch plate 24 and the worm wheel 13 abut each other, the driving force on the input axis 11 is transmitted to the output axis 16; and the clutch is turned "on." Disenergization of the electric coil 23 results in loss of the attraction force between the worm wheel 13 and the clutch plate 24. As a result the clutch plate 24 is urged toward the pinion gear 14 side by the force of the coil spring 25 and the engagement of the worm wheel 13, to cause the clutch plate 24 to turn off.

Figure 3:
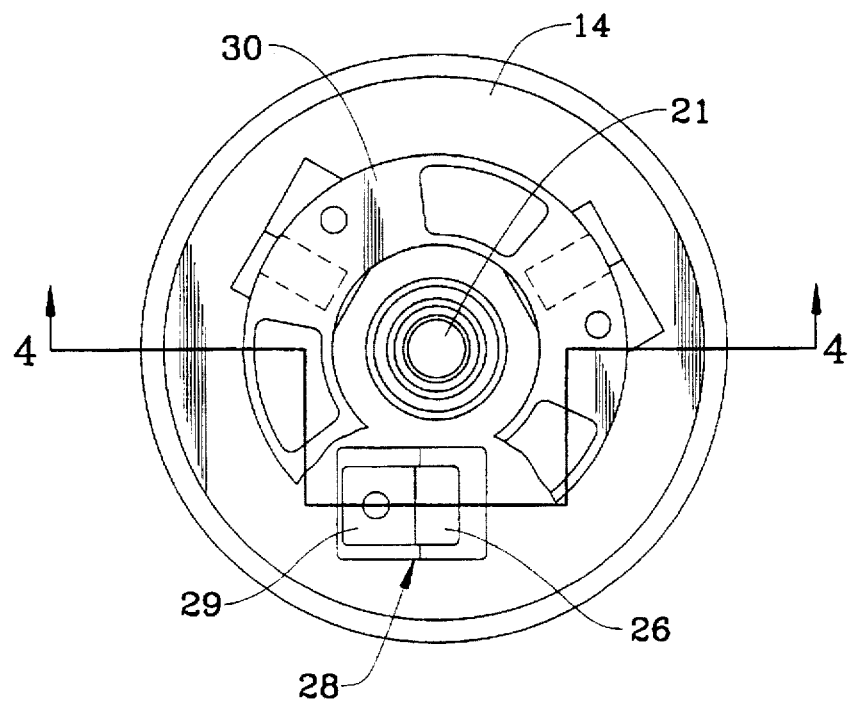
FIG. 3 is a partly broken view of the electro-magnetic clutch of the embodiment.
Figure 4:
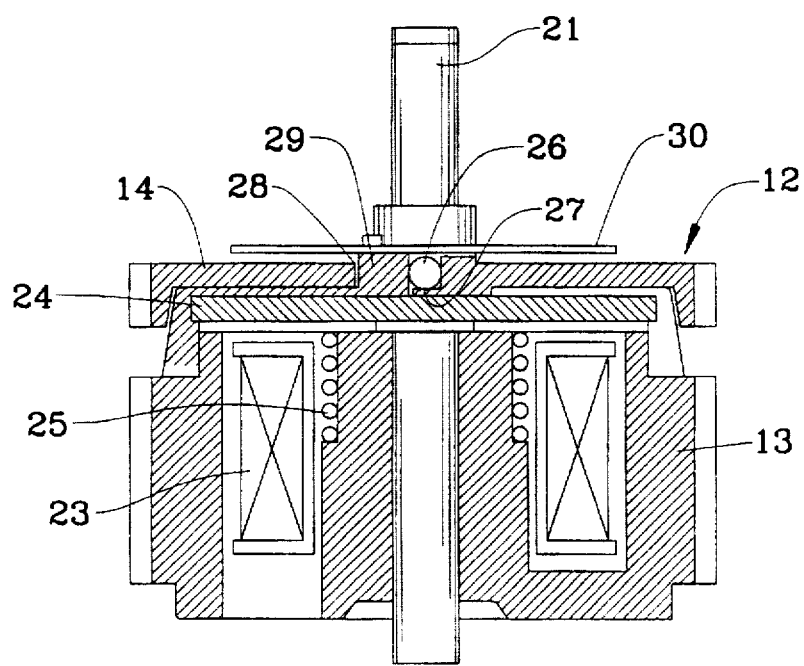
FIG. 4 is a view showing operation of a movable member of the embodiment.
Figure 5:
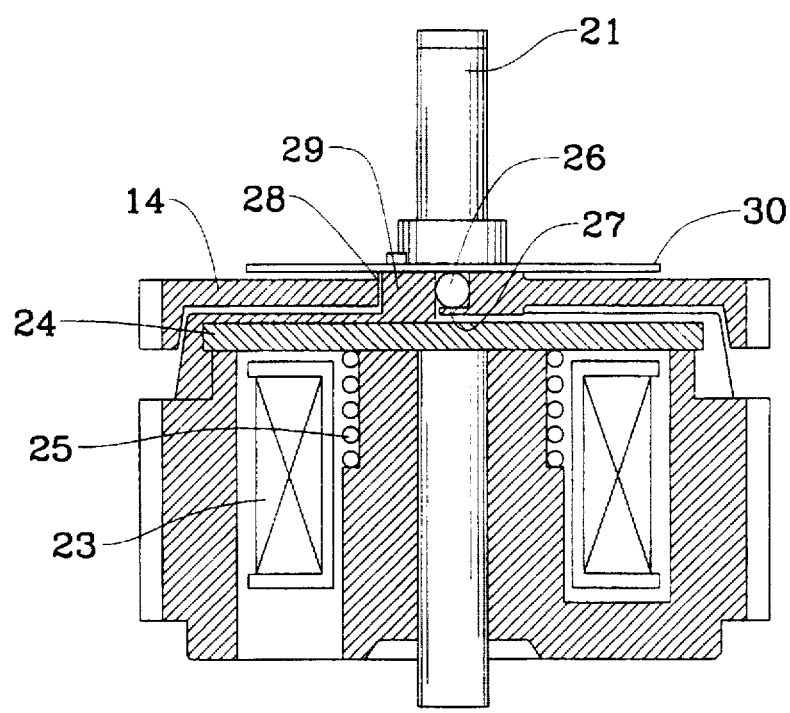
FIG. 5 is a view showing operation of the movable member of the embodiment.

The structure of the slide mechanism along the rotation axis 21 of the clutch plate 24, an essential part of the invention, will be elucidated below with reference to FIGS. 3, 4, and 5. FIG. 3 is a partly broken view of the electro-magnetic clutch 12 as seen from the direction of arrow 3 in FIG. 2. FIG. 4 is a cross sectional view taken alone line 4—4 of FIG. 3 when the electro-magnetic clutch 12 is at "off"; FIG. 5 is a cross sectional view taken along line 4—4 of FIG. 3 when the electro-magnetic clutch 12 is at "on." Each of the cylindrical auxiliary slide members 26 is arranged in the space between a protrusion 29 formed on the clutch plate 24 and a hole portion (wall of hole) 28 formed on the pinion gear 14 so that the clutch plate 24 can slide smoothly. The auxiliary slide members 26 are arranged approximately at equal angular intervals on the clutch plate 24 so that their axes pass through the center of the rotation axis 21 and are substantially perpendicular to the rotation axis 21. When the clutch plate 24 slides along the rotation axis 21, the use of rolling of the cylindrical auxiliary slide members 26 also enables the clutch plate 24 to slide smoothly. Retaining means (cover plate) 30 is formed, as is stated, on the clutch plate 24 to hold the auxiliary slide members 26, and retaining parts (shoulders) 27 are also formed on the pinion gear 14 to hold the auxiliary slide members 26. As a result, when the clutch plate 24 slides, the auxiliary slide members 26 always roll without springing outward.

In this embodiment, a driving wire 18 always pulls an arm 17 in the direction opposite to its forward rotation as shown by an arrow in FIG. 1; and so when the clutch is at "on," the auxiliary slide members 26, the pinion gear 14, and the protrusions 29 formed on the clutch plate 24 always abut each other. Also there are three auxiliary slide members 26 on the clutch plate 24 in the embodiment; however, we have no intention to limit the number of the auxiliary slide members 26 to three. The number of auxiliary slide members 26 may be other than three if they are arranged at equal intervals on the clutch plate 24.

The present invention can be applied to an electro-magnetic clutch having a different structure from that of the electro-magnetic clutch 12 in the embodiment, also providing good results.

It should be noted that still further objects of the present invention will become apparent in the entire disclosure and that modifications apparent in the art can be done without departing the gist and scope of the present invention as disclosed herein and claimed as appended.

What is claimed is:

1. An electro-magnetic clutch comprising:

a first rotating member rotatable about a rotation axis in response to a driving force applied to an input axis;

a second rotating member disposed opposing said first rotating member, freely rotatable about the rotation axis of said first rotating member, and coupled to an output axis;

a movable member formed to be rotatable together with one of said first and second rotating members and disposed opposing the other of said first and second rotating members;

a spring urging said movable member toward one of said first and second rotating members;

an electric coil for generating a force to drive said movable member toward the other of said first and second rotating members;

hole portions formed on one of said first and second rotating members;

protrusions formed on said movable member and slidably fitting into said hole portions; and auxiliary slide members disposed in spaces formed between said protrusions and hole portions.

2. An electro-magnetic clutch as defined by claim 1, wherein said auxiliary slide members are either a ball or a cylindrical rod having an axis passing through the vicinity of a center of said rotation axis and substantially perpendicular to said rotation axis.

3. An electro-magnetic clutch as defined by claim 1, wherein said auxiliary slide members are arranged on said movable member approximately at equal intervals around said rotation axis.

4. An electro-magnetic clutch as defined by claim 1, wherein retaining parts of said auxiliary slide members are formed beneath said spaces containing said auxiliary slide members on either one of said first and second rotating members.

5. An electro-magnetic clutch as defined by claim 2, wherein said auxiliary slide members are arranged on said movable member approximately at equal intervals around said rotation axis.

6. An electro-magnetic clutch as defined by claim 2, wherein retaining parts of said auxiliary slide members are formed beneath said spaces containing said auxiliary slide members on either one of said first and second rotating members.

7. An electro-magnetic clutch as defined by claim 6, wherein said auxiliary slide members are arranged on said movable member approximately at equal intervals around said rotation axis.

8. An electro-magnetic clutch as defined by claim 1, wherein said movable member is rotatable together with the second rotating member.

9. An electro-magnetic clutch as defined by claim 8, wherein said hole portions are provided on the second rotating member.

10. An electro-magnetic clutch as defined by claim 9, wherein the first rotating member is a worm wheel, and the second rotating member is a pinion gear.

11. An electro-magnetic clutch as defined by claim 10, wherein said movable member is a clutch plate.

12. An electro-magnetic clutch as defined by claim 2, wherein each of said auxiliary slide members is a cylindrical rod.

* * * * *